US010397590B2

(12) United States Patent
Cohen et al.

(10) Patent No.: US 10,397,590 B2
(45) Date of Patent: Aug. 27, 2019

(54) SYSTEM AND METHOD FOR ENABLING SEEK IN A VIDEO RECORDING

(71) Applicant: NICE-SYSTEMS LTD, Ra'anana (IL)

(72) Inventors: Yaron Cohen, Modiin (IL); Tal Zur, Rishon-Lezion (IL); Oren Winkler, Pardes-Hana (IL); Boris Katzman, Petah Tikva (IL); Oren Feld, Kfar-Saba (IL)

(73) Assignee: NICE-SYSTEMS LTD., Ra'anana (IL)

( * ) Notice: Subject to any disclaimer, the term of this patent is extended or adjusted under 35 U.S.C. 154(b) by 296 days.

(21) Appl. No.: 15/368,720

(22) Filed: Dec. 5, 2016

(65) Prior Publication Data

US 2018/0160149 A1    Jun. 7, 2018

(51) Int. Cl.
*H04N 19/40* (2014.01)
*H04N 21/2343* (2011.01)

(52) U.S. Cl.
CPC ......... *H04N 19/40* (2014.11); *H04N 21/2343* (2013.01)

(58) Field of Classification Search
CPC .............................. H04N 19/70; H04N 19/172
USPC ...................................................... 375/240.25
See application file for complete search history.

(56) References Cited

U.S. PATENT DOCUMENTS

| 2003/0231867 | A1* | 12/2003 | Gates | H04N 5/783 386/344 |
| 2007/0025688 | A1* | 2/2007 | Pejhan | H04N 5/783 386/344 |
| 2015/0319442 | A1* | 11/2015 | Puri | H04N 19/61 375/240.15 |

* cited by examiner

*Primary Examiner* — On S Mung
(74) *Attorney, Agent, or Firm* — Soroker Agmon Nordman

(57) ABSTRACT

A recording server and method for recording and modifying a video dataset, the recording server including a memory storing a code, and at least one processor configured to execute the code, wherein the code includes instructions for receiving a video dataset including an initial fully-coded frame and subsequent plurality of partially-coded frames, selecting at least one of the plurality of partially-coded frames, for replacement of each of the selected frames with a corresponding fully-coded frame, and for each selected partially-coded frame, calculating the corresponding fully-coded frame and replacing the selected partially-coded frame with the calculated corresponding fully-coded frame.

22 Claims, 3 Drawing Sheets

SYSTEM AND METHOD FOR ENABLING SEEK IN A VIDEO RECORDING

FIELD OF THE INVENTION

The present disclosure generally relates to video recordings, and more specifically, to passive recording of real-time H264 video streaming.

BACKGROUND

Some recording tools provide the ability to record, store and playback of real time video interactions. These tools are useful, for example, for quality management, compliance purposes and other suitable uses.

Video compressing by Advanced Video Coding (AVD), such as H.264 video compression, supports most efficient video compression techniques available today. Passive recording by real-time H.264 video streaming is a recording method in which a replica of the video and voice packets to be recorded are sent to a recorder that is connected to the destination port of the mirroring session of the interaction.

AVD methods usually encode a video stream by representing at least some of the frames by reference to a previous frame. For example, a first frame may be fully coded and a next frame or multiple next frames may be partially-coded, i.e. represented by only the changed pixels with respect to a previous frame. The result is a compressed video stream, which occupies a reduced storage and/or bandwidth volume. The occupied volume is smaller as the compressed video stream includes fewer fully-coded frames, and many providers leave a single fully-coded frame in the beginning of the stream, wherein the rest of the stream is produced by partially-recorded frames.

SUMMARY

According to an aspect of some embodiments of the present invention, there is provided a recording server for recording and modifying a video dataset, the recording server including a memory storing a code, and at least one processor configured to execute the code, wherein the code includes instructions for receiving a video dataset including an initial fully-coded frame and subsequent plurality of partially-coded frames, selecting at least one of the plurality of partially-coded frames, for replacement of each of the selected frames with a corresponding fully-coded frame, and for each selected partially-coded frame, calculating the corresponding fully-coded frame and replacing the selected partially-coded frame with the calculated corresponding fully-coded frame.

According to some embodiments, the calculating of a corresponding replacement fully-coded frame is performed by adding to the initial fully-coded frame all the pixel changes included in the partially-coded frames between the initial fully-coded frame and the replaced partially-coded frame, inclusive.

According to some embodiments, the code includes instructions for allocating to each frame in the received video dataset a serial number, and instructions for allocating to the replacing fully-coded frame the same serial number as the serial number of the replaced partially-coded frame.

According to some embodiments, the code includes instructions for recording each frame of the video dataset with a corresponding timestamp representing the capturing time of the frame.

According to some embodiments, the code includes instructions for recording a corresponding audio dataset received in parallel to the video dataset, along with timestamps representing the capturing time periods of the audio data.

According to some embodiments, the code includes instructions for producing a time-mapping table for exclusively identifying a serial number of each frame with a timeslot.

According to some embodiments, the code includes instructions for creating a synced media file by grouping into a synced media file frames attributed to corresponding timeslots according to the time-mapping table, each along with audio data corresponding to the corresponding timeslot.

According to some embodiments, the code includes instructions for creating a revised video dataset by replacing the partially-coded frames with fully-coded frames in a copy of the received video dataset, and wherein the synced media file is created based on the revised dataset and constitutes a seekable synced media file.

According to some embodiments, the replacing of the selected partially-coded frame with the calculated corresponding fully-coded frame is performed in the synced media file to create a revised synced media file constituting a seekable synced media file.

According to some embodiments, the selecting of at least one of the plurality of partially-coded frames is performed according to a predetermined required group of pictures (GOP) size of a resulting media file.

According to some embodiments, the code includes instructions for calculating a GOP size of the received dataset and replacing partially-coded frames with fully-coded frames in order to reach a desired GOP size.

According to some embodiments, the replacing of the selected partially-coded frame with the calculated corresponding fully-coded frame produces a resulting media file having the same total number of frames as the received video dataset.

According to an aspect of some embodiments of the present invention, there is provided a method for recording and modifying a video dataset, the method including receiving a video dataset including an initial fully-coded frame and subsequent plurality of partially-coded frames, selecting at least one of the plurality of partially-coded frames, for replacement of each of the selected frames with a corresponding fully-coded frame, and for each selected partially-coded frame, calculating the corresponding fully-coded frame and replacing the selected partially-coded frame with the calculated corresponding fully-coded frame.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

Figure 1:
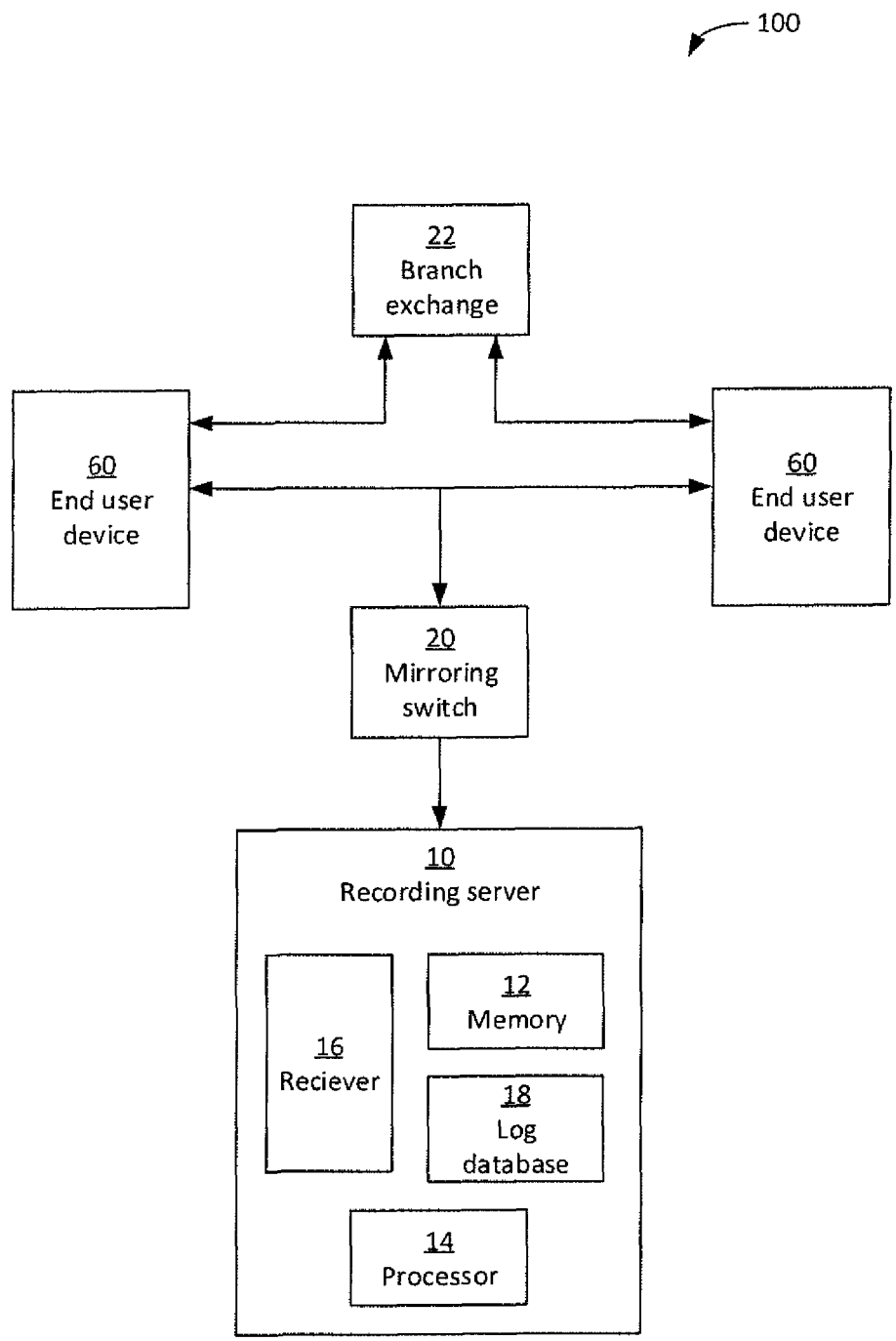
Figure 2:
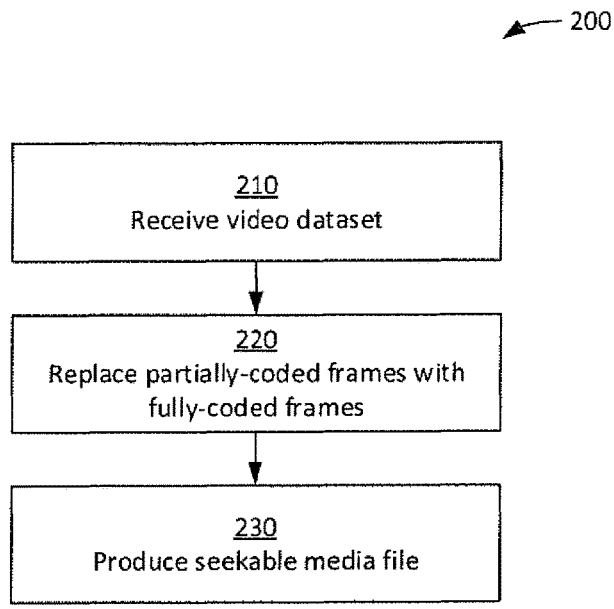
Figure 3:
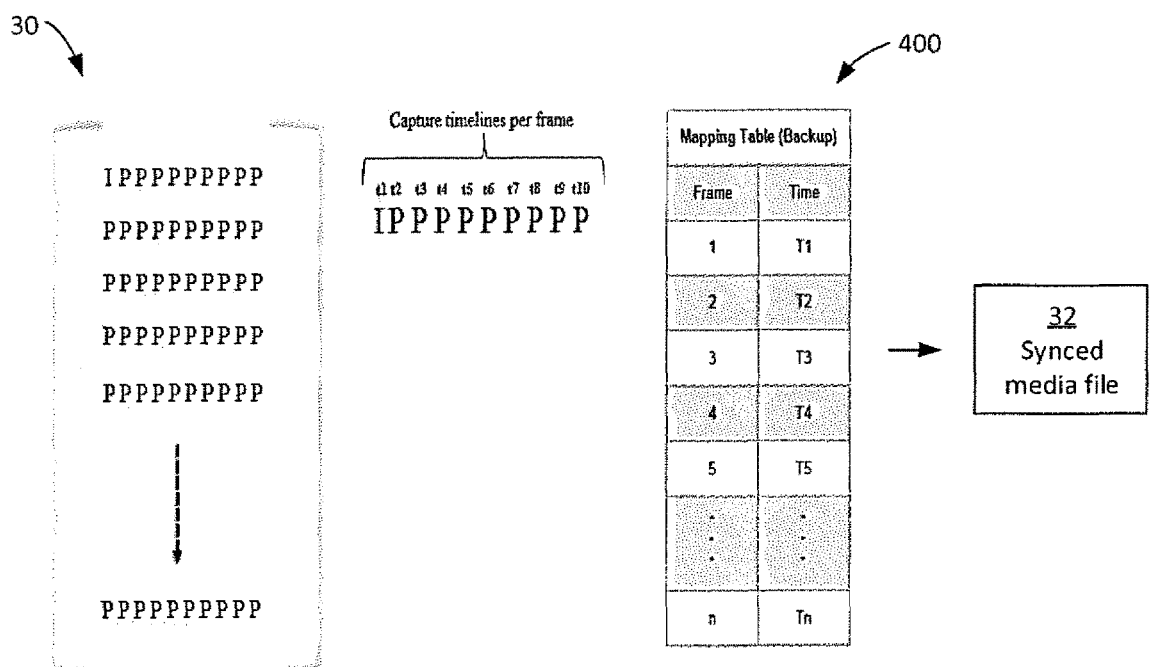
Figure 4:
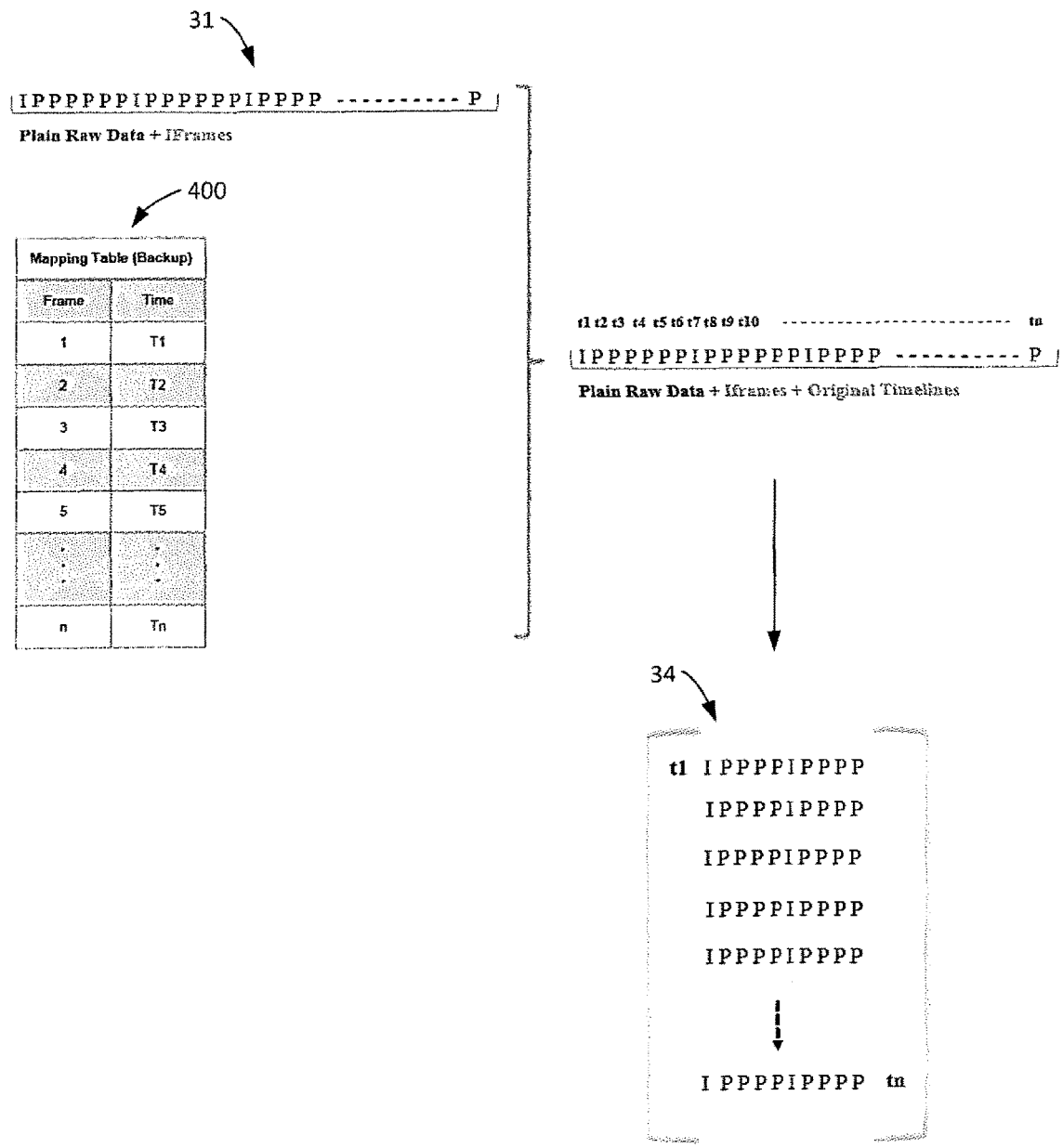

FIG. 1 is a schematic illustration of an exemplary system for video recording including a recording server for recording and modifying a video dataset, according to some embodiments of the present invention;

FIG. 2 is a schematic flowchart illustrating a method for recording and modifying a video dataset, according to some embodiments of the present invention;

FIG. 3 is a schematic illustration of a production process of a time-mapping table for synchronizing of video frames of a received video dataset with corresponding audio, according to some embodiments of the present invention; and FIG. 4 is a schematic illustration of a production process of a seekable media file based on a time-mapping table, according to some embodiments of the present invention.

DETAILED DESCRIPTION

In the context of the present disclosure, without limiting, term 'telephonic' relates to data transfers between two or more devices. The data may be of any form, such as voice, image or video or any other medium, transferable over any type or combination of communication facilities, such as PSTN (Public Switched Telephone Network), computer networks, Internet or wireless communications.

In the context of the present disclosure, without limiting, the term 'recording' is unambiguously directed to two concepts; one concept is the operation of converting audio signals to a storable format or an organization, and the other concept relates to data obtained from the conversion operation. Thus, the terms are unequivocally distinct as evident in the context thereof and as the first one relates to an operation and the other one related to a noun such as data.

In the context of some embodiments of the present disclosure, without limiting, a playlist is a set of recordings of telephonic interaction, inclusive of recordings of handovers between parties of the interaction. It is noted that a playlist may include one recording of the interaction. The playlist is amendable, at least partly, to an audible presentation.

As used herein, the term 'parallel' or 'concurrent' with respect to operations implies one or more operations operative in a practically and/or sufficient concurrent manner, yet not necessarily strictly simultaneously.

In the context the present disclosure, without limiting, the term 'PBX' (Private Branch Exchange) denotes any instrument or apparatus that provides a telephonic access and switching and/or routing.

For brevity and unless otherwise specified, referring to a call implies a telephonic video and audio communication, for example, a switched telephone network (STN), voice over internet protocol (VoIP) telephony, computer-telephony integration (CTI), and/or any other suitable telecommunications method.

The terms cited above denote also inflections and conjugates thereof.

Some embodiments of the present invention provide a solution to enable seeking of so a frame in a compressed video coded by Advanced Video Coding (AVD) such as H.264, which supports most efficient video compression techniques available today.

AVD methods used in some embodiments of the present invention encode a video dataset including multiple successive frames, such as a video file or data stream, by representing at least some of the frame by reference to a previous frame. For example, a first frame and/or another frame of the video dataset may be fully coded and thus may be obtained, e.g. decoded, stored and/or reproduced, independently from other frames. A next frame or multiple next frames may be partially-coded, i.e. each may be represented in the video dataset by coding of only the changed pixels with respect to a previous frame. The result is a compressed video dataset, which occupies a reduced storage and/or bandwidth volume. In order to optimize the size reduction of the video dataset, it may be coded, for example, with a single fully-coded frame, for example the first frame of the video dataset, and the rest of the frames are represented by the changed pixels, each with respect to a previous frame.

A problem solved by some embodiments of the present invention is related to the resources and time consuming rendering process of the partially-coded frames when seeking for a frame in a compressed video. In order to obtain a certain frame of a video dataset, coded by AVD, the frame must be rendered from the last fully-coded frame. In case the coded video dataset includes a single or a very few fully-coded frames, this usually means an expensive and time-consuming rendering process.

A solution according to some embodiments of the present invention reduces the time and resources required for rendering a frame, for example during a seeking process. The provided solution includes adding fully-coded frames to a compressed video dataset instead of corresponding partially-coded frames, while keeping the video dataset synchronized with a corresponding audio dataset, for example of a same media dataset. Thus, the provided solution facilitates faster and cheaper seeking process and rendering of partially-coded frames.

A solution according to some embodiments of the present invention includes creation of a revised media file, in which partially-coded frames are replaced by fully-coded frames.

Another problem solved by some embodiments of the present invention is a desynchronization of video and audio datasets that may be caused by losing and/or skipping video frames in the recording and/or generation process of a media file.

A solution according to some embodiments of the present invention prevents desynchronization by allocating a serial number to each video frame and placing the video frames in corresponding time slots according to their serial number.

Reference is now made to FIG. 1, which is a schematic illustration of an exemplary system 100 for video recording including a recording server 10 for recording and modifying a video dataset, according to some embodiments of the present invention. Reference is further made to FIG. 2, which is a schematic flowchart illustrating a method 200 for recording and modifying a video dataset, according to some embodiments of the present invention.

Recoding server 10 may record and modify a video dataset so as to enable seeking of a certain frame in a resulting stored media file. Recoding server 10 may include a memory 12 and at least one processor 14. Processor 14 may carry out code stored in memory 12, which may include instructions for performing method 200. As indicated in block 210, recording server 10 may receive to a receiver 16 video and/or audio datasets. For example, recording server 10 receives via a mirroring switch 20 video streams and/or audio streams intercepted from a video call between two or more end user communication devices 60 such as, for example, desktop computers, VoIP apparatuses, CTI apparatuses or any other suitable devices for communication by audio and video. For example, recording server 10 constitutes or communicates with a mirroring destination port associated with mirroring switch 20.

The communication connection between end user communication devices 60 may be performed via a branch exchange 22 such as a PXB. For example, a first end user communication device 60 obtains a connection with a second end user communication device 60 by sending a request via branch exchange 22. Branch exchange 22 links and establishes a call between the first and second end user communication devices 60, for example by enabling direct (such as peer-to-peer) communication between them.

In some embodiments or the present invention, the received video dataset includes a single or a very few fully-coded frames. For example, a received video dataset 30 (shown in FIG. 3) may include a fully coded frame I in the beginning of the dataset and partially-coded frames P in the rest of the dataset, each represented by coding of only the changed pixels with respect to the previous frame.

In some embodiments of the present invention, for example in order to enable synchronization of video and audio in a resulting seekable media file, recording server 10 may produce from a received video dataset and a corresponding audio dataset a synced media file.

Reference in now made to FIG. 3, which is a schematic illustration of a production process of a time-mapping table 400 for synchronizing of video frames of a received video dataset 30 with corresponding audio, according to some embodiments of the present invention.

In some embodiments of the present invention, a received video dataset 30 is recorded in a log database 18 of recording server 10, such that each of the frames/and P in the dataset 30 is recorded along with a timestamp $t_1, t_2 \ldots t_N$ representing the capturing time of the frame. A corresponding audio dataset, for example an audio dataset received in parallel to the video dataset, may similarly be recorded along with timestamps representing the capturing timeslots of the audio data.

Processor 14 may match a serial number 1, 2 . . . N to each of the received frames, for example according to the timestamps, i.e. a higher serial number to a later-captured frame, fully-coded and partially-coded. Processor 14 may then produce a time-mapping table 400, wherein each frame serial number is exclusively identified with a timeslot $T_1, T_2 \ldots T_N$ that matches the corresponding timestamp $t_1, t_2 \ldots t_N$ of the frame. Based on time-mapping table 400, for example by matching video frames to audio captured in the same time slots, processor 14 may create a synced media file 32. For example, processor 14 creates synced media file 32 by grouping into a synced media file 32 raw data and metadata of fully-coded and partially-coded frames of a received video dataset 30 attributed to the corresponding timeslots, each along with audio data of the corresponding timeslot, i.e. audio data captured during the corresponding timeslot.

As indicated in block 220, processor 14 may replace partially-coded frames P with fully-coded frames I in a copy of the received video dataset 30 and/or in the corresponding synced media file 32. Processor 14 may select which partially-coded frames are to be replaced by fully-recorded frames, according to a predetermined required group of pictures (GOP) size, i.e. the ratio between the number of all frames and the number of fully-coded frames in the resulting media file. For example, the required GOP is determined according to the frame rate of the video dataset and a desired seeking interval resolution, wherein a seeking interval resolution is a time interval between two fully-coded frames. For example, when a user desires a seeking interval resolution of one second, i.e. a fully-coded frame every second, and the frame rate of the video dataset is 30 frames per second, the required GOP is 30. Based on the required GOP, processor 14 may determine the number of partially-coded frames to be replaced by fully-recorded frames and the intervals between the replaced frames. For example, processor 14 may locate the replacement fully-coded frames I with constant time intervals and/or constant number of partially-coded frames P between them.

In some embodiments of the present invention, processor 14 calculates the GOP size of the received video dataset. In case the GOP size is not sufficient, for example below a predetermined threshold, processor 14 replaces partially-coded frames with fully-coded frames in order to reach a desired GOP size. For example, the threshold may be determined by a user according to certain implementation requirements.

In order to replace a partially-coded frame with a fully-coded frame, processor 14 may calculate a corresponding replacement fully-coded frame by adding to the last fully-coded frame all the pixel changes included in the partially-coded frames between the last fully-coded frame and the replaced partially-coded frame, inclusive.

Reference is now made to FIG. 4, which is a schematic illustration of a production process of a seekable media file 34 based on a time-mapping table 400, according to some embodiments of the present invention. As indicated in block 230, processor 14 may produce, based on time-mapping table 400, seekable media file 34 with synced audio and video.

For example, processor 14 revises the received video dataset 30 by replacing partially-coded frames with fully-coded frames in the received video dataset 30 or in a copy of dataset 30, and then creates based on the revised video dataset 31 and time-mapping table 400 a synced media file 32, which constitutes a seekable media file 34, as described in detail herein. In other embodiments, processor 14 creates a synced media file 32 as described in detail herein, based on the originally received video dataset 30 and time-mapping table 400, and then revises media file 32 by replacing partially-coded frames in media file 32 with fully-coded frames. The revised media file 32 constitutes a seekable media file 34. Thus, the resulting media file 34 may include the same total number of frames, fully-coded and partially-coded, as the received video dataset 30. Each replacing frame has the same serial number as the replaced frame.

In order to prevent desynchronization processor 14 allocates to a replacing fully-coded frame the same serial number allocated to the partially-coded frame. The serial number is associated exclusively with a timeslot, so that the replacing fully-coded frame is inserted in the same time slot in table 400 as the replaced partially-coded frame.

More specifically, processor 14 may map each video frame I and P in the revised video dataset to a corresponding timeslot based on time-mapping table 400, according to the frame's serial number. That is, for example, processor 14 may allocate a corresponding timestamp $t_1, t_2 \ldots t_N$ to each video frame I and P, based on the matching timeslot $T_1, T_2 \ldots T_N$ in table 400, and create a seekable media file 34 by grouping frames of the revised video dataset attributed to corresponding timeslots according to the time-mapping table, each along with audio data of the corresponding timeslot.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a program or a part thereof operating or interacting with one or more other parts of the system.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A recording server to enable seeking of a frame in a video dataset, the recording server comprising:
   a memory storing a code; and
   at least one processor configured to execute the code, wherein the code comprises instructions for:
      receiving a video dataset and a corresponding audio dataset, wherein the video dataset includes an initial fully-coded frame (I-frame) and a subsequent plurality of partially-coded frames (P-frame);
      selecting, based on a seek interval resolution for seeking a frame in the video dataset, at least one of the plurality of partially-coded frames, for replacement with a corresponding fully-coded frame; and
      creating a seekable media file from the video dataset by calculating the corresponding fully-coded frame for each selected partially-coded frame and replacing each selected partially-coded frame in the video dataset with the calculated corresponding fully-coded frame while keeping the video dataset synchronized with the corresponding audio dataset, so as to enable seeking of the frame in the seekable media file.

2. The recording server of claim 1, wherein the code comprises instructions for calculating the corresponding fully-coded frame by adding to the initial fully-coded frame all the pixel changes included in the partially-coded frames between the initial fully-coded frame and the replaced partially-coded frame, inclusive.

3. The recording server of claim 1, wherein the code comprises instructions for allocating a serial number to each frame in the received video dataset, and instructions for allocating to the replacing fully-coded frame, the same serial number as the serial number of the replaced partially-coded frame.

4. The recording server of claim 1, wherein the code comprises instructions for selecting the at least one of the plurality of partially-coded frames according to a predetermined required group of pictures (GOP) size of a resulting media file.

5. The recording server of claim 4, wherein the code comprises instructions for calculating a GOP size of the received video dataset and replacing partially-coded frames with fully-coded frames in order to reach a desired GOP size.

6. The recording server of claim 1, wherein the code comprises instructions for replacing each selected partially-coded frame with the calculated corresponding fully-coded frame which produces a resulting media file having a same total number of frames as the received video dataset.

7. A method to enable seeking of a frame in a video dataset, the method comprising:
   receiving a video dataset and a cores ding audio dataset wherein the video dataset includes an initial fully-coded frame (1-frame) and a subsequent plurality of partially-coded frames (P-frame);
   selecting, based on a seek interval resolution for seeking a frame in the video dataset, at least one of the plurality of partially-coded frames; for replacement with a corresponding fully-coded frame; and
   creating a seekable media file from the video dataset by calculating the corresponding fully-coded frame for each selected partially-coded frame and replacing each selected partially-coded frame in the video dataset with the calculated corresponding fully-coded frame while keeping the video dataset synchronized with the corresponding audio dataset, so as to enable seeking of the frame in the seekable media file.

8. The recording server of claim 1, wherein the seek resolution interval is a time interval between two fully-coded frames.

9. The recording server of claim 1, wherein the code comprises instructions for recording each frame of the video dataset with a corresponding timestamp representing a capturing time of the frame.

10. The recording server of claim 9, wherein the code comprises instructions for recording the corresponding audio dataset received in parallel to the video dataset, along with timestamps representing capturing time periods of audio data.

11. The recording server of claim 9, wherein the code comprises instructions for producing a time-mapping table for identifying a serial number of each frame with a timeslot.

12. The recording server of claim 11, wherein the code comprises instructions for creating the seekable media file while keeping the video dataset synchronized with the corresponding audio dataset by grouping frames attributed to corresponding timeslots according to the time-mapping table, each along with audio data corresponding to the corresponding timeslot.

13. The method of claim 7, wherein calculating the corresponding fully-coded frame comprises adding to the initial fully-coded frame all the pixel changes included in the partially-coded frames between the initial fully-coded frame and the replaced partially-coded frame, inclusive.

14. The method of claim 7, further comprising allocating a serial number to each frame in the received video dataset, and allocating to the replacing fully-coded frame, the same serial number as the serial number of the replaced partially-coded frame.

15. The method of claim 7, wherein selecting the at least one of the plurality of partially-coded frames is performed according to a predetermined required group of pictures (GOP) size of a resulting media file.

16. The method of claim 15, further comprising calculating a GOP size of the received video dataset and replacing partially-coded frames with fully-coded frames in order to reach a desired GOP size.

17. The method of claim 7, wherein replacing each selected partially-coded frame with the calculated corresponding fully-coded frame produces a resulting media file having a same total number of frames as the received video dataset.

18. The method of claim 7, wherein the seek resolution interval is a time interval between two fully-coded frames.

19. The method of claim 7, further comprising recording each frame of the video dataset with a corresponding timestamp representing a capturing time of the frame.

20. The method of claim 19, further comprising recording the corresponding audio dataset received in parallel to the video dataset, along with timestamps representing capturing time periods of audio data.

21. The method of claim 19, further comprising producing a time-mapping table for identifying a serial number of each frame with a timeslot.

22. The method of claim 21, wherein creating the seekable media file while keeping the video dataset synchronized with the corresponding audio dataset comprises grouping frames attributed to corresponding timeslots according to the time-mapping table, each along with audio data corresponding to the corresponding timeslot.

* * * * *